United States Patent Office 2,966,084
Patented Dec. 27, 1960

2,966,084

SWINGING TEMPLET-HOLDER FOR MACHINE-TOOL EQUIPPED WITH A COPYING DEVICE

René Le Brusque, Malakoff, France, assignor, by mesne assignments, to Société Anonyme H. Ernault-Batignolles, Paris, France, a company of France Filed Sept. 13, 1955, Ser. No. 534,127

6 Claims. (Cl. 82—14)

The present invention relates to copying machine-tools, more particularly lathes, wherein means are provided for carrying out successive roughing and finishing steps controlled by a single templet.

Numerous types of copying devices are already known that permit of machining one or more work-pieces of which the shape is reproduced from a templet.

In such devices, adjusting means provided for machining a piece to the desired dimensions may assume different forms:

(1) The templet is fixed to the frame of the machine. The adjustment is effected by varying the distance between the tool and the feeler.

(2) The templet is movable transversely of the axis of machining. A slide supporting the feeler and the tool at a constant relative distance follows the displacements of the templet.

In this second type, there are also known devices wherein the templet holder is anchored to transverse guideways of a carriage movable along the machine-tool, the copying slide being slidably mounted on these guideways. The displacement of the templet-holder is effected by means of a transverse screw mounted in the saddle.

Such arrangements for adjustment and fixing of the templet-holder offer the disadvantage of being somewhat complicated and inaccurate owing to the fact that the adjustment and fixing members move together with the slide. They have also the inconvenience of being subjected to the cutting stresses of the tool.

The present invention has for its object to overcome these disadvantages. It is characterized in that the templet-holder constitutes a pendulum of which the axis of oscillation is parallel with the axis of machining and is not connected with any movable components of the machine-tool. It is, moreover, possible by means of adjusting means mounted on the frame of the machine to vary at will the distance between the axis of the templet and the axis of the work-piece.

The invention will be better understood with reference to the ensuing description and accompanying drawings in which.

Figure 1:
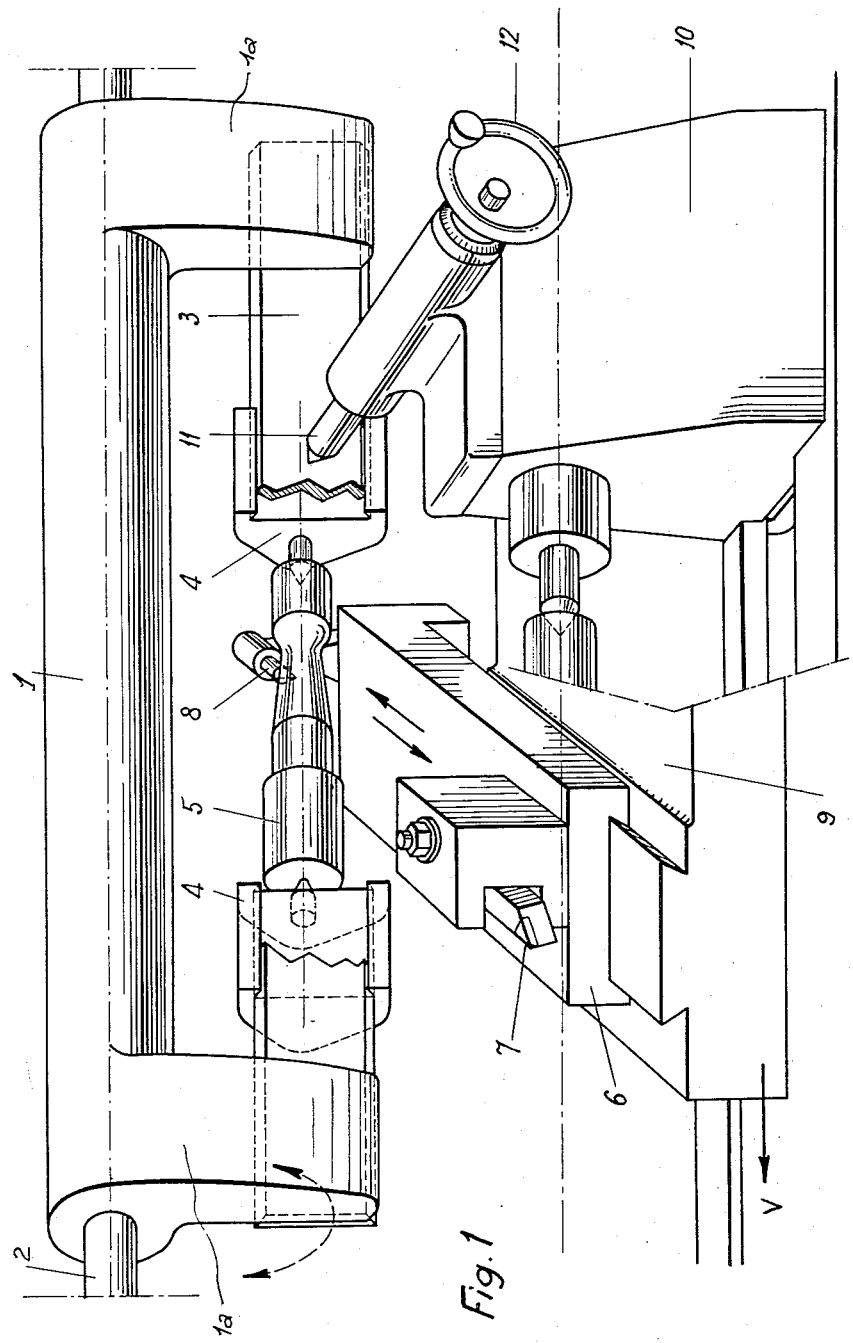
Fig. 1 is a perspective view of the swinging templet-holder and adjusting means therefor, in a first embodiment wherein the axis of oscillation is above the axis of the templet.

In the first embodiment (Fig. 1) the templet-holder consists of a support 1 having two radial arms 1a and swinging without play on a shaft 2 rigidly connected at its two ends on two supports fixed with respect to the frame of the lathe at the rear part thereof.

There is fixed to the ends of the two radial arms 1a a flat table 3 the plane of which contains the axis of oscillation of the swinging support. Two relatively movable templet end supports 4 between which the templet 5 is positioned, may slide on this table 3. For greater clarity of the drawing, the table 3 has been partially cut away to show the templet 5 in Figure 1.

The slide 6 of the copying device, having any desired orientation, carries the tool 7 and the feeler 8, while the carriage 9, supporting the slide 8 on a guide 9a and mounted on the rear part of the lathe, has a longitudinal feed V. Adjusting means for the templet position are mounted on the tailstock 10. They comprise a push-rod 11 which is brought into contact with the table 3 by means of a hand wheel 12 and of a screw-and-nut drive, thereby constituting a precision stop.

The templet holder assembly 1, owing to its own weight, always tends to bear with the table 3 against the end of the push-rod 11, thereby loosely coupling the templet holder with the slide. A graduated scale, operatively connected to the hand wheel 12, permits reading the displacements of the push-rod 11 and hence of the end position of the templet.

Figure 2:
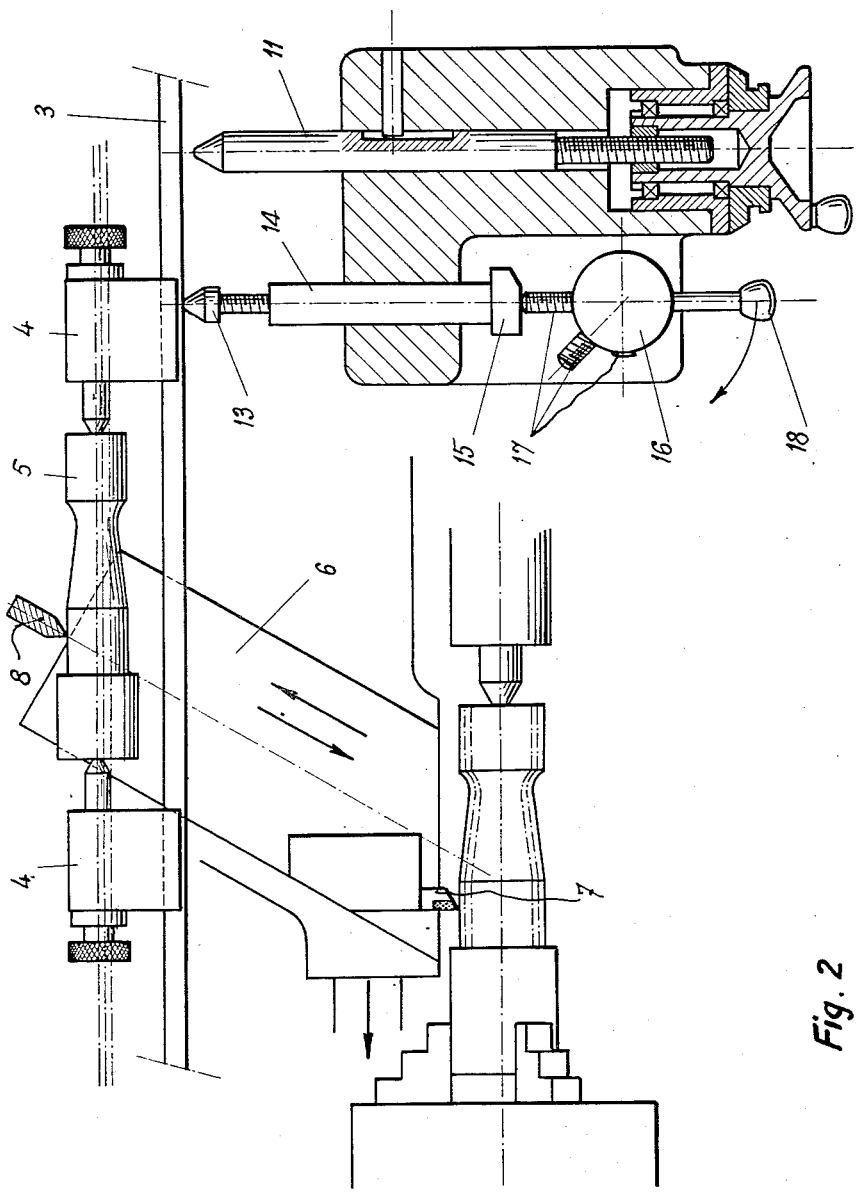
Fig. 2 is a top view of this first embodiment to which further control means have been added to make it possible to give the templet one or more positions corresponding to roughing cuts while retaining as a precision stop for final machining the adjusting means of Fig. 1.

Secondary adjusting means (Fig. 2) are mounted parallel with the precision stop 11. They consist of a screw stop 13 threadedly engaged in one end of a push-rod 14 having a head 15 at the other end thereof. A rotary turret 16 carries one or more stop screws 17 and a lever 18 fixed to the turret permits of rocking one of said stop screws 17 into operative engagement with the head 15. It is thus possible, without touching the precision stop 11, which will determine the end position of the templet and the outline of the work-piece at the time of the finishing cut, to adjust the depth of one or more roughing cuts.

Figure 3:
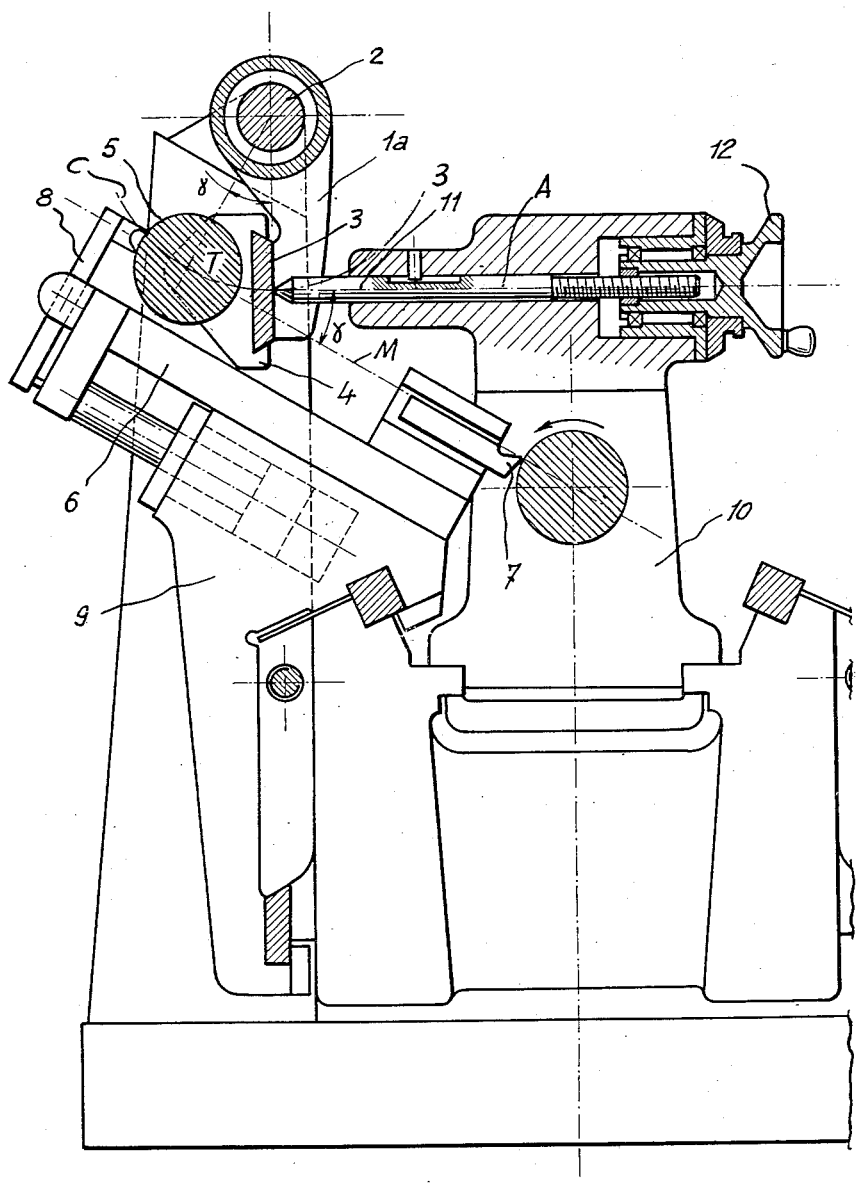
Fig. 3 is a transverse section of this first embodiment showing the disposition of the swinging templet-holder and adjusting means thereof.

The disposition of the swinging templet-holder (Fig. 3) is such that the axis A of the push-rod 11 is tangent with the circle C described by the axis T of the templet 5. Moreover, the angle γ of inclination of the radius of the circle C passing through the axis T of the templet 5 with respect to the plane of the table 3, is equal to the angle γ between the axis A of the rod 11 and the direction of movement M of the slide 6. In this manner, the value of the elementary displacement of the templet 5 in a direction parallel with the direction of movement of the slide 6, is always equal to the value of the horizontal elementary displacement of the push-rod 11.

The adjusting means, in this position, are mounted on the tail stock, however, they could be positioned on another stationary part of the machine (the headstock for instance).

Figure 4:
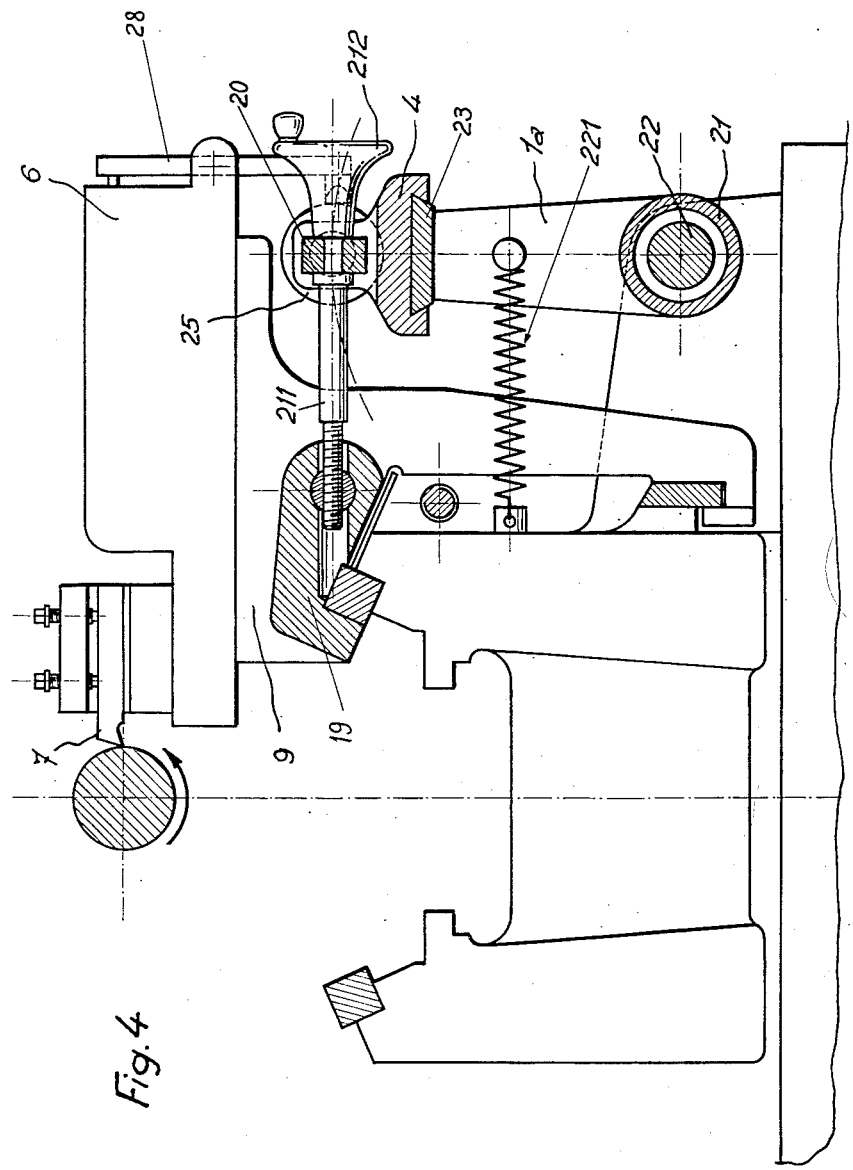
Fig. 4 shows a second embodiment wherein the axis of oscillation is located beneath the axis of the templet.
Figure 5:
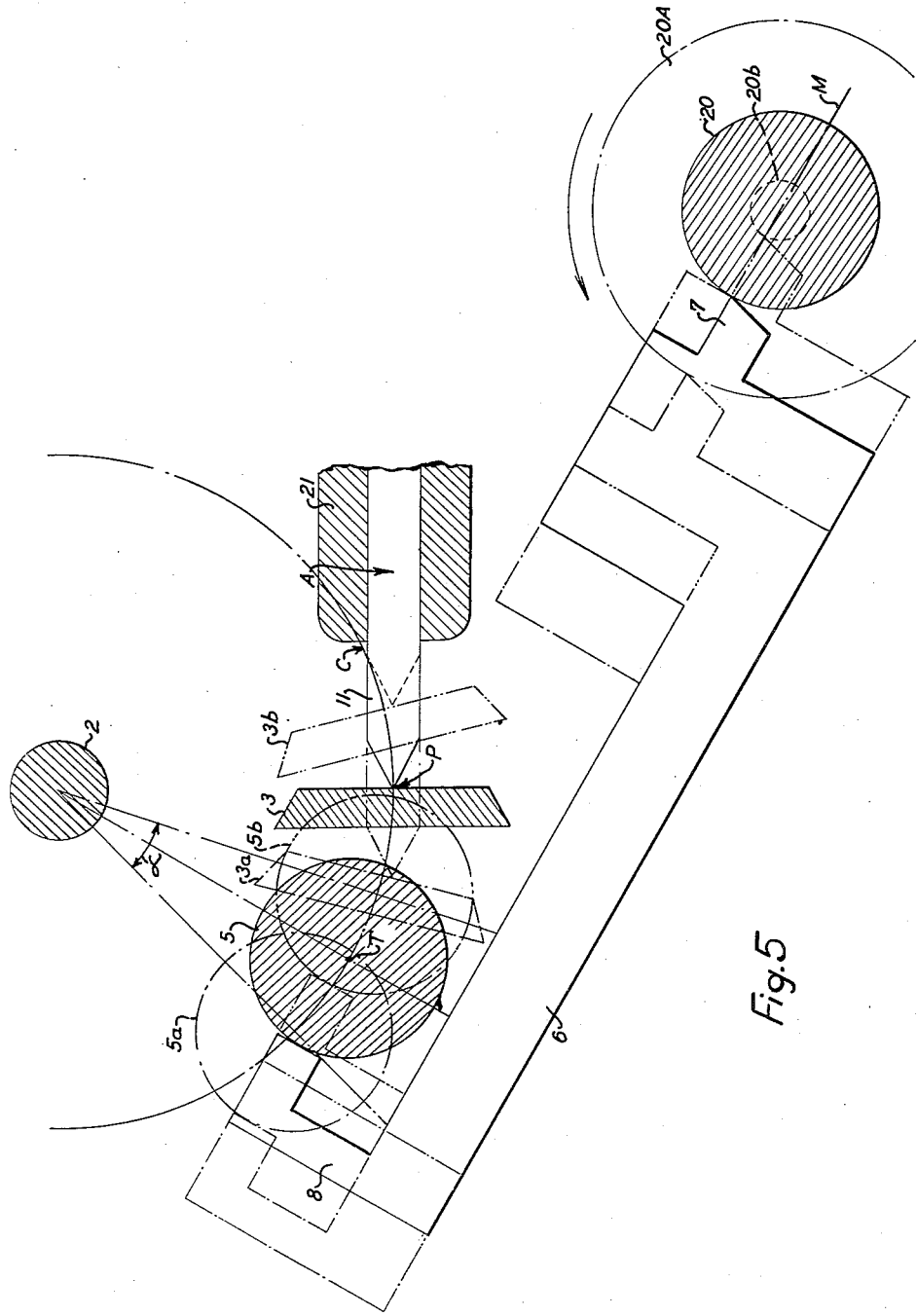
Fig. 5 is an enlarged view of a portion of Fig. 3.

In a second embodiment illustrated in Figure 4, the templete holder 21 is mounted on the front part of the lathe. The axis of oscillation 22 of the swinging templet-holder 21 is positioned beneath the axis of the templet 25. The adjusting means 211—212 are arranged between a support 19 fixed solid to the bed and a bearing 20 secured to the templet-carrying table 23.

In this second embodiment, the point of contact of the push-rod 211 with the table 23 as defined in the first embodiment coincides with the axis of the templet 25, and the table 23 may have any orientation.

A spring 221 eliminates backlash in the loose coupling of the templet holder to the slide in the direction of action of the feeler 28.

I claim:

1. A copying device for machine tools comprising in combination: support means for a workpiece defining a copying axis, a carriage movable longitudinally parallel to said copying axis, a slide mounted on said carriage for movement transversely to the copying axis, a machining tool and a templet feeler both mounted on said slide in mutually fixed relationship during machining of a workpiece, a support for a copying templet mounted for pendulous swinging motion about an axis parallel to and fixed with respect to said copying axis, an abutment on said templet support, a copying templet mounted on said support with its peripheral surface positioned to contact said feeler, said feeler having an active surface transverse to the direction of movement of said slide on said carriage with said feeler in tangential contact with said templet, and adjustable abutment means mounted in fixed relationship with respect to said workpiece support means to engage directly the abutment on said templet support during machining of a workpiece thereby to maintain said templet in predetermined work position relative to said copying axis, said abutment on said templet support comprising a planar element having its plane passing through the axis of swinging motion of said templet support and said adjustable abutment means comprising a push-rod slidable along a line tangential to the circle described by the axis of said templet during swinging motion of said support, the angle of intersection of the direction of movement of said slide by said line being equal to the angle of inclination of the radius of said circle passing through the templet axis with respect to said plane, whereby said slide and templet support are loosely coupled to each other for movement in unison transversely of the copying axis and the elementary displacements of the templet are equal in value to the horizontal elementary displacements of the push-rod.

2. A copying device as in claim 1 wherein said adjustable abutment means comprises a first push-rod, a turret, a plurality of stops of different lengths on said turret cooperating with said first push-rod to define successive work positions, a second push-rod, and a hand-wheel for adjusting said second push-rod to define a finishing position with said first push-rod disengaged from said stops.

3. A pendulous templet-holder for controlling the position of a tool with respect to the bed of a machine-tool, comprising a templet-holding member mounted on said bed to oscillate freely about an axis, a stopping member associated with said templet-holding member, a reference abutment secured on said machine-tool bed, said stopping member and reference abutment being provided with conjugate contact surfaces adapted to bear on each other in a predetermined spatial relative position of said stopping member, and means to accurately adjust the relative position of said reference abutment with respect to said templet-holding member so as to permit said stopping member to be brought into immutable spatial position to limit, in cooperation with said reference abutment, the freedom of angular displacement of said templet-holding member to a desired precise angular position, said stopping member defining a plane passing through the axis of oscillation of said templet-holding member and said reference abutment being movable along a line tangential to the circle described by the templet axis during oscillation, the angle of intersection of the direction of movement of the tool by said line being equal to the angle of inclination of the radius of said circle passing through the templet axis with respect to said plane, whereby the elementary displacements of the templet are equal in value to the horizontal elementary displacements of the stopping member.

4. A pendulous templet-holder according to claim 3, further comprising a plurality of supplemental abutments movably mounted on the machine-tool bed to be successively interposed on the angular path of the stopping member, to stop the templet-holding member in a plurality of successive angular positions for controlling successive operations of the tool.

5. A copying device according to claim 1, wherein the pivoting axis of the templet support is located out of the vertical extending through the center of gravity of the templet support in operative position and on that side of said vertical which causes said templet support to be urged toward the adjustable abutment means by its own weight.

6. A copying device according to claim 5, wherein the pivoting axis of the templet support is located at a level higher than said support with the latter freely suspended from said pivoting axis.

References Cited in the file of this patent
UNITED STATES PATENTS

| | | |
|---|---|---|
| 804,793 | Chard et al. | Nov. 14, 1905 |
| 971,679 | Kirby | Oct. 4, 1910 |
| 982,034 | Chard | Jan. 17, 1911 |
| 999,629 | Chard | Aug. 1, 1911 |
| 1,205,970 | Burrell | Nov. 28, 1916 |
| 1,245,653 | Wood | Nov. 6, 1917 |
| 1,950,039 | Smith et al. | Mar. 6, 1934 |

FOREIGN PATENTS

| | | |
|---|---|---|
| 623,357 | Germany | Dec. 5, 1935 |